United States Patent
Baudouin et al.

(10) Patent No.: US 10,640,218 B2
(45) Date of Patent: May 5, 2020

(54) METHOD FOR DETECTING THE PRESENCE OF ICE CRYSTALS IN AN ENVIRONMENT

(71) Applicant: Zodiac Aerotechnics, Plaisir (FR)

(72) Inventors: Philippe Baudouin, Lévis Saint-Nom (FR); Ludovic Bonneau, Flexanville (FR)

(73) Assignee: Zodiac Aerotechnics, Plaisir (FR)

( * ) Notice: Subject to any disclaimer, the term of this patent is extended or adjusted under 35 U.S.C. 154(b) by 0 days.

(21) Appl. No.: 16/196,534

(22) Filed: Nov. 20, 2018

(65) Prior Publication Data

US 2019/0161197 A1 May 30, 2019

(30) Foreign Application Priority Data

Nov. 28, 2017 (FR) .................................... 17 61297

(51) Int. Cl.
*G01N 21/47* (2006.01)
*B64D 15/20* (2006.01)
(Continued)

(52) U.S. Cl.
CPC ......... *B64D 15/20* (2013.01); *G01N 15/0211* (2013.01); *G01N 21/35* (2013.01);
(Continued)

(58) Field of Classification Search
CPC combination set(s) only.
See application file for complete search history.

(56) References Cited

U.S. PATENT DOCUMENTS 5,285,256 A    2/1994   Nelson et al.
5,500,530 A *   3/1996   Gregoris .............. G01N 21/359
                                                                  244/134 F
(Continued)

FOREIGN PATENT DOCUMENTS

CN          101581787 A      11/2009
FR            2970946 A1       8/2012

OTHER PUBLICATIONS

French Patent Application No. 1761297, Search Report dated Jun. 29, 2018.
(Continued)

*Primary Examiner* — Hai Phan
*Assistant Examiner* — Son Tang
(74) *Attorney, Agent, or Firm* — Kilpatrick Townsend & Stockton LLP; Dean W. Russell (57) ABSTRACT

The invention relates to a method for detecting the presence of ice crystals in an environment, implemented by a detection device in relative motion with respect to said environment, said method comprising at least:
- an emission step, in which at least one optical radiation is emitted by the detection device into the environment;
- a reception step, in which at least a portion of the emitted optical radiation is received,
- a step of calculating a comparison signal, and
- a step of calculating the noise of the comparison signal,
- a thresholding step, in which the noise is compared to a defined threshold,
- a communication step, in which a signal indicating detection of the presence of ice crystals in the environment is transmitted when the noise is greater than the defined threshold.

9 Claims, 4 Drawing Sheets

(51) Int. Cl.
  *G01N 21/35* (2014.01)
  *G01N 15/02* (2006.01)
  *G01N 15/00* (2006.01)
  *G01N 21/17* (2006.01)

(52) U.S. Cl.
  CPC ......... *G01N 21/47* (2013.01); *G01N 21/4738* (2013.01); *G01N 2015/0046* (2013.01); *G01N 2015/0222* (2013.01); *G01N 2021/1748* (2013.01)

(56) References Cited

U.S. PATENT DOCUMENTS

| | | | | |
|---|---|---|---|---|
| 5,838,239 | A * | 11/1998 | Stern | B64D 15/20 340/583 |
| 6,040,916 | A * | 3/2000 | Griesinger | B60T 8/172 340/905 |
| 6,091,335 | A | 7/2000 | Breda et al. | |
| 8,704,181 | B2 * | 4/2014 | Thorez | B64D 15/20 244/134 F |
| 8,796,627 | B2 * | 8/2014 | Rockwell | G01N 21/4738 250/341.8 |
| 2003/0183752 | A1 * | 10/2003 | Kobayashi | B60S 1/0818 250/222.2 |
| 2004/0036630 | A1 | 2/2004 | Jamieson et al. | |
| 2005/0167593 | A1 * | 8/2005 | Forsyth | G01N 21/314 250/339.11 |
| 2009/0222238 | A1 * | 9/2009 | Gagnon | B64D 15/20 702/172 |
| 2011/0313702 | A1 * | 12/2011 | Funamoto | G01J 3/12 702/85 |
| 2012/0093501 | A1 * | 4/2012 | He | H04B 10/07953 398/26 |
| 2012/0140233 | A1 * | 6/2012 | Rockwell | G01N 21/55 356/445 |
| 2012/0193477 | A1 | 8/2012 | Thorez et al. | |
| 2012/0274938 | A1 * | 11/2012 | Ray | B64D 15/20 356/342 |
| 2013/0100438 | A1 * | 4/2013 | Breuer | G01P 13/00 356/51 |
| 2013/0113926 | A1 * | 5/2013 | Chen | B64D 15/20 348/135 |
| 2014/0149075 | A1 * | 5/2014 | Toci | B23K 31/125 702/182 |
| 2016/0238510 | A1 | 8/2016 | Bachalo et al. | |

OTHER PUBLICATIONS

Mark D. Ray et al., "Optical Detection of Airborne Ice Crystals and Liquid Water Droplets", AAIA Atmospheric and Space Environments Conference, vol. AIAA 2009-3863, Jun. 22-25, 2009, American Institute of Aeronautics and Astronautics, pp. 1-15.

\* cited by examiner

METHOD FOR DETECTING THE PRESENCE OF ICE CRYSTALS IN AN ENVIRONMENT

CROSS REFERENCE TO RELATED APPLICATIONS

This application claims priority from French Patent Application No. 1761297 filed Nov. 28, 2017, the entire contents of which are incorporated herein by this reference.

FIELD OF THE INVENTION

The present invention relates to the field of detecting icing conditions in an environment, in particular by optical devices on board aircraft that are in flight in the atmosphere.

BACKGROUND OF THE INVENTION

When an aircraft passes through a cloud containing water particles in the supercooled liquid state, these particles cause accretion of a layer of ice on certain parts of the aircraft. To prevent such a phenomenon from occurring, a method for detecting ice which enables detection of such ice accretions is known from document FR 2 970 946. However, the detection method described in that document does not allow detecting ice crystals already formed and present in the atmosphere.

Such ice crystals do not accrete on the aircraft but bounce on it. Such already-formed ice crystals can cause engine icing phenomena leading to power losses and/or phenomena distorting the information transmitted by the speed, angle, or temperature sensors of the aircraft . . . . It is therefore essential to detect such already-formed ice crystals.

SUMMARY OF THE INVENTION

The present invention aims to provide a method for detecting the presence of ice crystals in an environment. For this purpose, an object of the present invention is a method for detecting the presence of ice crystals in an environment, implemented by a detection device in relative motion with respect to said environment, said method comprising at least:
  an emission step, in which at least one optical radiation is emitted by the detection device into the environment;
  a reception step, in which at least a portion of the emitted optical radiation is received by the detection device, said at least a portion of the received radiation including rays within a first wavelength band and rays within a second wavelength band;
  characterized in that the detection method further comprises at least:
  a calculation step, in which the detection device calculates a comparison signal Comp(t) representative of the contrast, said contrast being obtained from the following formula:

$$Comp(t) = \frac{R_{\lambda 2}(t) - R_{\lambda 1}(t)}{R_{\lambda 2}(t) + R_{\lambda 1}(t)}$$

where $R_{\lambda 1}(t)$ is the intensity over time t of the rays within the first wavelength band and $R_{\lambda 2}(t)$ is the intensity over time of the rays within the second wavelength band, and a noise calculation step, in which a noise of the comparison signal Comp(t) is calculated,
  a thresholding step, in which the noise is compared to a defined threshold,
  a communication step, in which a signal indicating detection of the presence of ice crystals in the environment is transmitted when the noise is greater than the defined threshold.

According to some particular embodiments, the detection method comprises one or more of the following characteristics, individually or in combination with one another:
  the detection method further comprises at least a sampling step, in which a time window is defined.
  the detection method further comprises at least:
    a continuation step, in which a next time window shifted in time by a duration with respect to time window is considered, and/or
    a loop step, in which the noise calculation step and the thresholding step are repeated;
  the shift duration is less than the duration of the time window;
  the detection method further comprises at least:
    an incrementing step in which a value of a counter is incremented when the noise is greater than the defined threshold, and/or
    a confirmation step, in which the value of the counter is compared to a triggering threshold.
  the communication step, is transmitted when the value of the counter is greater than the triggering threshold.
  the detection method further comprises at least a reset step in which the counter value is initialized to zero
  the noise calculation step comprises a step of calculating a standard deviation of the comparison signal Comp(t) in the time window considered.
  the noise calculation step comprises a step of calculating the Fourier transform of the comparison signal in the time window considered.

Of course, the various features, variants, and/or embodiments of the present invention can be associated with each other in various combinations, as long as they are not incompatible with or exclusive of one another.

BRIEF DESCRIPTION OF THE DRAWINGS

The invention will be better understood and other features and advantages will become apparent from reading the detailed description which follows, comprising embodiments given solely as illustrative examples with reference to the appended figures, presented as non-limiting examples. These serve to complete one's understanding of the invention and the description of its implementation and, where appropriate, contribute to its definition, and are given with reference to the figures in which.

DETAILED DESCRIPTION OF THE INVENTION

It should be noted that, in the figures, the structural and/or functional elements common to the various embodiments may have the same references. Thus, unless otherwise stated, such elements have identical structural, dimensional, and material properties.

Figure 1:
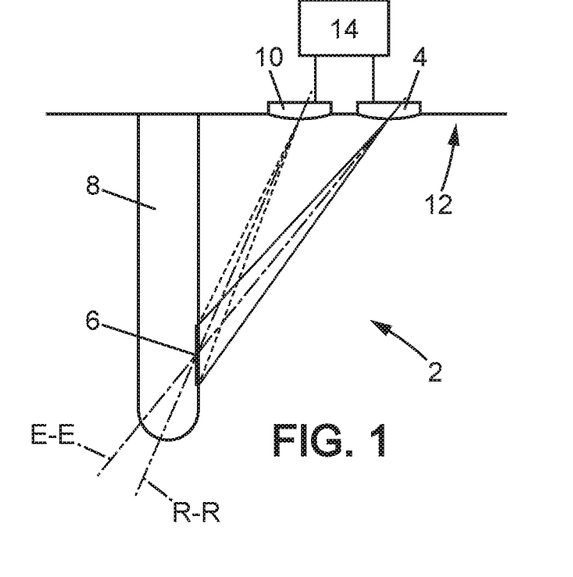
FIG. 1 is a schematic view of an example of an ice detection device capable of implementing the method for detecting ice crystals according to the invention.

FIG. 1 is a schematic view of an exemplary embodiment of an ice detection device 2. Such an ice detection device 2 can be used to implement the detection method according to the invention.

More particularly, the ice detection device 2 can be fixed on an outer surface of an aircraft, such as a wing, tail, fuselage, engine nacelle, or any other location, in particular specified by an aircraft manufacturer.

With reference to FIG. 1, the ice detection device 2 comprises
 a transmitter 4, advantageously a single transmitter 4, having an emission axis E-E, and
 a receiver 10 having a reception axis R-R.

In addition, according to the example shown in FIG. 1, the ice detection device 2 also includes a protuberance 8 comprising a target surface 6. The target surface 6 can be scattering or reflecting depending on the geometry of the ice detection device 2.

The ice detection device 2 may also comprise at least one optical filtering means arranged upstream of the receiver 10.

According to an alternative embodiment, the ice detection device 2 may comprise a first optical filtering means arranged upstream of a first portion of the receiver 10 and/or a second optical filtering means arranged upstream of a second portion of the receiver 10, preferentially distinct from the first portion of the receiver 10.

As an example, the optical filtering means is a bandpass filter. Alternatively, the ice detection device 2 may comprise a first low-pass filter arranged upstream of a first portion of the receiver 10 and/or a second bandpass filter arranged upstream of a second portion of the receiver 10 that is distinct from the first portion of the receiver 10.

In FIG. 1, the filtering means, in particular the first low-pass filter and the second bandpass filter, is not shown.

The transmitter 4 is capable of emitting optical radiation, preferably having a wavelength comprised between 1.1 μm and 1.7 μm.

According to one particular embodiment, the reception axis R-R of the receiver 10 intersects the emission axis E-E of the transmitter 4. In particular, the emission axis E-E of the transmitter 4 intersects the reception axis R-R of the receiver substantially in the plane defined by the target surface 6.

The protuberance 8, also called a probe, preferably has an aerodynamic profile. Such an aerodynamic profile is defined in particular by the National Advisory Committee for Aeronautics in general, also known as NACA.

In particular, in the embodiment illustrated in FIG. 1, the protuberance 8 has a cylindrical shape that extends perpendicularly to an outer surface 12 of the aircraft.

In addition, the target surface 6 is adapted to allow reflection or scattering, depending on the geometry of the ice detection device 2, of at least a portion of the optical radiation emitted by the transmitter 4.

The receiver 10 is able to capture at least a portion of the optical radiation scattered or reflected by the target surface 6.

The first filtering means is able to filter optical radiation in a first wavelength band $\lambda_1$, in particular comprised between 1.3 μm and 1.45 μm, more particularly comprised between 1.4 μm and 1.45 μm, even more particularly equal to 1.42 μm.

The second filtering means is able to filter optical radiation in a second wavelength band $\lambda_2$, in particular comprised between 1.5 μm and 1.7 μm, more particularly comprised between 1.5 μm and 1.6 μm, even more particularly equal to 1.55 μm.

The transmission properties of the wavelength bands $\lambda_1$ and $\lambda_2$ through ice and/or through liquid water are different.

The properties of the wavelength bands $\lambda_1$ and $\lambda_2$ make it possible to differentiate the presence of ice from the presence of liquid water in an optical path of the radiation, in particular by comparing the intensities of the optical radiation captured in the first wavelength band $\lambda_1$ and in the second wavelength band $\lambda_2$.

The detection device 2 further comprises a computer 14. More specifically, the computer 14 is able to measure at least:
 a first variation $R_{\lambda 1}(t)$, over time, in the intensity of the optical radiation in the first wavelength band $\lambda_1$, captured in particular by the first portion of the receiver 10, and
 a second variation $R_{\lambda 2}(t)$, over time, in the intensity of the optical radiation in the second wavelength band $\lambda_2$, captured in particular by the second portion of the receiver 10.

Advantageously, according to the invention, in order to compare the variations over time of the first variation $R_{\lambda 1}(t)$ and the second variation $R_{\lambda 2}(t)$, a comparison signal Comp (t) is calculated. This comparison signal Comp(t) may in particular be a contrast between the first variation $R_{\lambda 1}(t)$ and the second variation $R_{\lambda 2}(t)$. This contrast is defined according to the formula:

$$Comp(t) = \frac{R_{\lambda 2}(t) - R_{\lambda 1}(t)}{R_{\lambda 2}(t) + R_{\lambda 1}(t)}$$

According to the invention, the variation of the comparison signal Comp(t) over time as calculated by the computer 14 is used to determine and/or deduce the presence and/or absence of ice in an environment, in particular such as the atmosphere.

According to one particular embodiment, the comparison signal Comp(t) is a contrast signal Comp(t) representative of a variation in the contrast of the radiation over time.

In particular, for this purpose, the computer 14 is interfaced to the transmitter 4 and to the receiver 10.

According to a first variant, the transmitter 4 of the detection device 2 comprises two emitting lasers. A first laser is able to emit optical radiation in the first wavelength band $\lambda_1$ and a second laser is able to emit in the second wavelength band $\lambda_2$. The first laser and the second laser are, for example, placed inside the fuselage of an aircraft and point outward through a porthole. In this embodiment, the device no longer comprises first and second optical filtering means for the wavelength bands $\lambda_1$ and $\lambda_2$. Thus arranged, the first laser and the second laser illuminate a target surface exposed to the relative flux of the atmosphere.

According to a second variant, the detection device 2 does not comprise any protuberance 8. In such a configuration, the target surface 6 is arranged directly on an outer surface of the aircraft.

According to a third variant, the transmitter 4 and the receiver 10 of the detection device 2 are arranged facing one another and at a distance from one another. In such an arrangement, the detection device 2 is able to detect ice crystals passing between the transmitter 4 and the receiver 10. In this case, the emission axis E-E and the reception axis R-R are advantageously coincident. They therefore intersect each other at a multiplicity of points.

Figure 2:
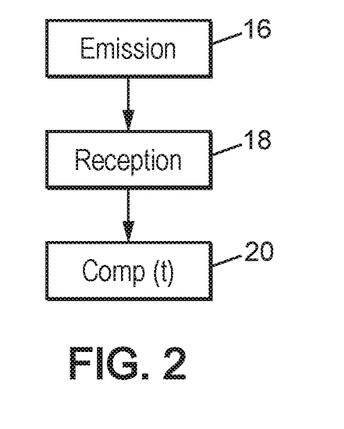
FIG. 2 is a flowchart representing a first part of the steps of the method for detecting ice crystals according to the invention.

We now refer to FIG. 2 which is a flowchart representing a first part of the steps of the method for detecting ice crystals according to the invention.

The detection method comprises a first step 16, called the emission step 16, during which the transmitter 4, in particular under the control of the computer 14, emits optical radiation towards the target surface 6. According to the embodiment of FIG. 1, the emitted optical radiation is scattered or reflected by the target surface 6.

Then, all or part of this radiation passes through the first filtering means and/or all or part of this radiation passes through the second filtering means.

According to an alternative embodiment, a first portion of this radiation passes through the first filtering means and another portion of this radiation passes through the second filtering means.

As a result, the detection method comprises a second step 18, called the reception step 18, during which the optical radiation, in particular scattered or reflected by the target surface 6, is received by the receiver 10.

Following the reception of the optical radiation, in particular the scattered or reflected radiation, the detection method comprises a complementary step called the identification step, during which the ice detection device 2 filters the received optical radiation according to defined wavelength bands, in particular according to the first wavelength band $\lambda_1$ and the second wavelength band $\lambda_2$.

As a result, the detection method comprises an additional step called the sending step, during which the receiver 10 transmits to the computer 14 the variation over time of a characteristic parameter of the optical radiation, such as the intensity of the radiation, in the wavelength bands defined in the identification step, in particular the first variation $R_{\lambda,1}(t)$ over time of the intensity of the radiation in the first wavelength band $\lambda_1$ as well as than the second variation $R_{\lambda,2}(t)$ over time of the intensity of the radiation in the second wavelength band $\lambda_2$.

Following the sending step, the detection method comprises an additional step 20 called the calculation step 20, during which the computer 14 calculates the variation of the comparison signal Comp(t) over time.

The presence of ice crystals in the environment, in particular the atmosphere, traversed by the optical radiation emitted and/or reflected and/or scattered and received by the receiver 10, generates a variation over time in the intensity of the radiation, in particular the first variation $R_{\lambda,1}(t)$ over time of the intensity of the radiation in the first wavelength band $\lambda_1$, and/or the second variation $R_{\lambda,2}(t)$ over time of the intensity of the radiation in the second wavelength band $\lambda_2$, exhibiting large and sudden amplitude variations.

A comparative measurement of the variation in intensity of the optical radiation, advantageously respectively the first variation $R_{\lambda,1}(t)$ and the second variation $R_{\lambda,2}(t)$, then makes it possible to detect the presence of ice crystals in the environment, in particular ice crystals which intercept the emitted and/or scattered and/or reflected radiation. Similarly, according to the invention, it is also possible to detect the presence of ice crystals that strike the target surface 6.

In particular, the comparative measurement may advantageously be performed by calculating:
the comparison signal Comp(t) over time, and
the noise B of the comparison signal Comp(t).

Figure 3:
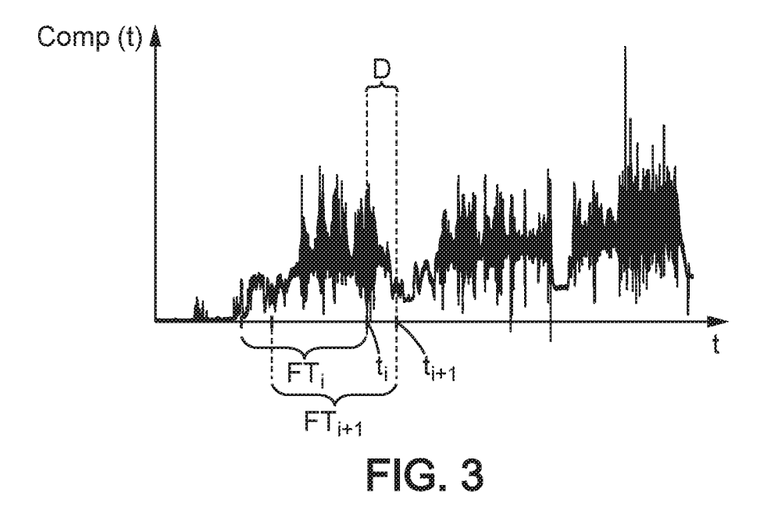
FIG. 3 is a graph representing a contrast signal over time.

FIG. 3 is an example of a curve representative of the comparison signal Comp(t) over time in the case where the comparison signal Comp(t) is the contrast signal Comp(t). As can be seen in this figure, the contrast signal Comp(t) is particularly "agitated" in the presence of ice crystals.

For this purpose, the previously described steps, namely the emission step 16, the reception step 18, the identification step, the sending step, and the calculation step 20, continue over time, particularly for the entire duration of the flight.

As a result, the invention provides complementary steps 22 to 30 for the detection method according to the invention, to detect the presence of ice crystals in the environment.

Depending on the nature of the optical radiation emitted by the transmitter 10, the complementary steps 22 to 30 concern discrete or continuous data.

Thus, if the transmitter 10 emits pulsed optical radiation at a predefined frequency, a point in the comparison signal Comp(t) is obtained after receiving the radiation for each emitted pulse. The comparison signal Comp(t) obtained after receiving the radiation is discrete. The points of the comparison signal Comp(t) are then processed during steps 22 to 30 of the detection method according to the invention.

If the transmitter emits continuous optical radiation, the comparison signal Comp(t) obtained after receiving the radiation is continuous. In this case as well, the comparison signal Comp(t) is then processed during steps 22 to 30 of the detection method according to the invention.

Figure 4:
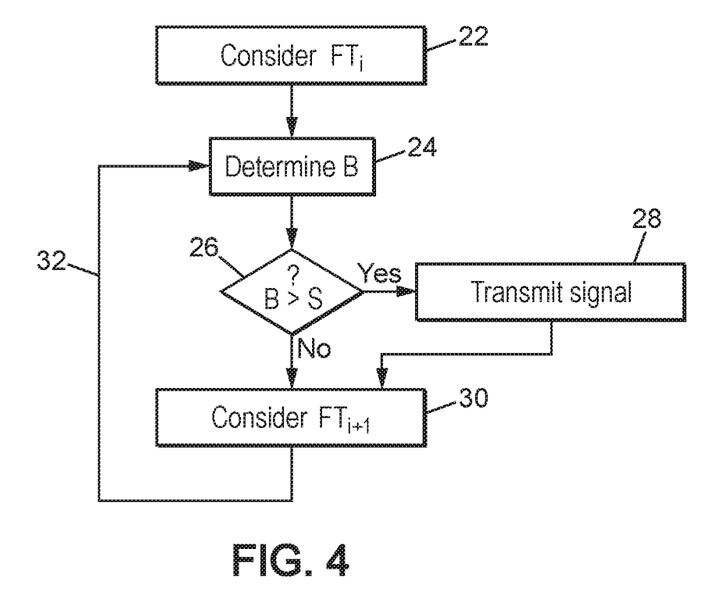
FIG. 4 is a flowchart representing a second part of the steps of the method for detecting ice crystals according to the invention.

FIG. 4 shows a diagram detailing complementary steps 22 to 30 as the second part of the steps of the method for detecting ice crystals according to the invention.

More specifically, during a step 22, called the sampling step 22, at time $t_i$, the computer 14 considers a sample of the comparison signal Comp(t). The sample is within a time window $FT_i$ containing:
in the case of a discrete comparison signal Comp(t), a certain number of points of the comparison signal Comp (t) calculated immediately before time $t_i$, and
in the case of a continuous comparison signal Comp(t), a portion of the comparison signal Comp(t) calculated immediately before time $t_i$.

During a step 24, called the noise calculation step 24, the computer 14 calculates the noise B of the comparison signal Comp(t) for the time window $FT_i$ considered.

In one particular embodiment, preferably the noise B of the comparison signal Comp(t) is equal to the value of the standard deviation $\sigma$ of the comparison signal Comp(t).

During a step 26, called the thresholding step 26, the noise B is compared to a defined threshold S. Then,
if the noise B is greater than the threshold S, the computer 14 transmits a signal indicating detection of the presence of ice crystals in the environment, such as the atmosphere, during a step 28, called the communication step 28, in particular towards the cockpit, and
if the noise B is below the threshold S, a step 30 called the continuation step 30 is carried out, in which, at time $t_{i+1}$, a new next time window $FT_{i+1}$ is considered in order to repeat the calculation of the noise B of the comparison signal Comp(t) and the computer 14 considers the comparison signal Comp(t), discrete or continuous, in the next time window $FT_{i+1}$ which succeeds time window $FT_i$.

The communication step 28 is a step of detecting the presence of ice crystals.

Similarly, optionally, the continuation step 30 may be initiated after the detection signal is transmitted in the communication step 28.

Advantageously, the next time window $FT_{i+1}$ has the same duration as time window $FT_i$. The next time window $FT_{i+1}$ is shifted in time by a duration D. Preferably, the shift duration D is less than the duration of a time window.

The next time window $FT_{i+1}$ comprises a certain number of points, or a portion of the comparison signal Comp(t) calculated immediately before time $t_{i+1}$.

During a next step 32, also called the loop step 32, the process returns to the noise calculation step 24 during which the computer 14 determines the noise B in the next time window $FT_{i+1}$.

Preferably, the noise calculation step 24, the thresholding step 26, the communication step 28, the continuation step 30, and the loop step 32 are repeated on the comparison signal Comp(t) over time, for all or part of the flight duration. Advantageously, the detection method according to the invention is implemented continuously for the entire duration of the flight.

Figure 5:
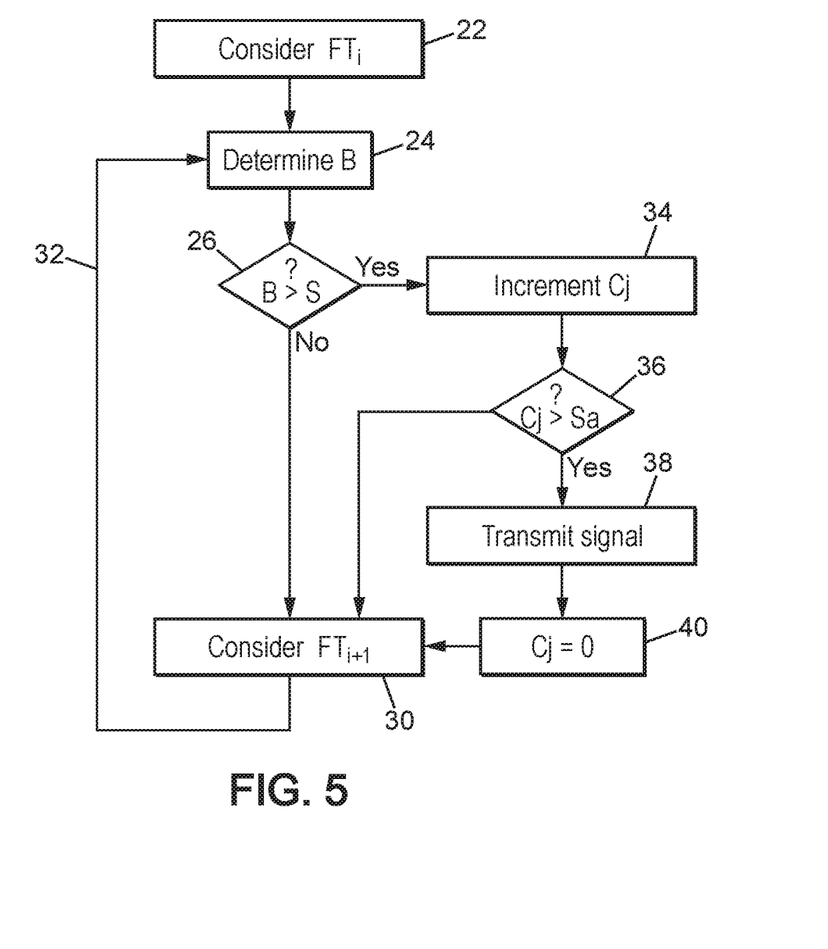
FIG. 5 is a flowchart representing the steps of a variant of the second part of the method for detecting ice crystals according to the invention.

Reference is now made to FIG. 5 which represents a variant of the second part of the detection method according to the invention. In this variant, the noise calculation step 24, the thresholding step 26, the continuation step 30, and the loop step 32 are identical to the noise calculation step 24, thresholding step 26, continuation step 30, and loop step 32 of the detection method described in relation to FIG. 4 and will not be described again.

If, during the thresholding step 26, the noise B is greater than the threshold S, then the computer 14 increments a value Cj of a counter, during a step 34 called the incrementing step 34.

As a result, during a step 36 called the confirmation step 36, the value Cj of the counter is compared to a triggering threshold Sa. Then,
if the value Cj is greater than the triggering threshold Sa, the computer 14 transmits a signal indicating detection of the presence of ice crystals in the environment, such as the atmosphere, during a step 38 called the communication step 38, in particular towards the cockpit, and in addition the computer 14 can initialize the value Cj of the counter to zero during a step 40 called the reset step 40, and
if the value Cj is lower than the triggering threshold Sa, the continuation step 30 is performed during which a new next time window $FT_{i+1}$ is considered for repeating the calculation of noise B in the comparison signal Comp(t).

In this embodiment, the communication step 38 is a step of detecting the presence of ice crystals.

Figure 6:
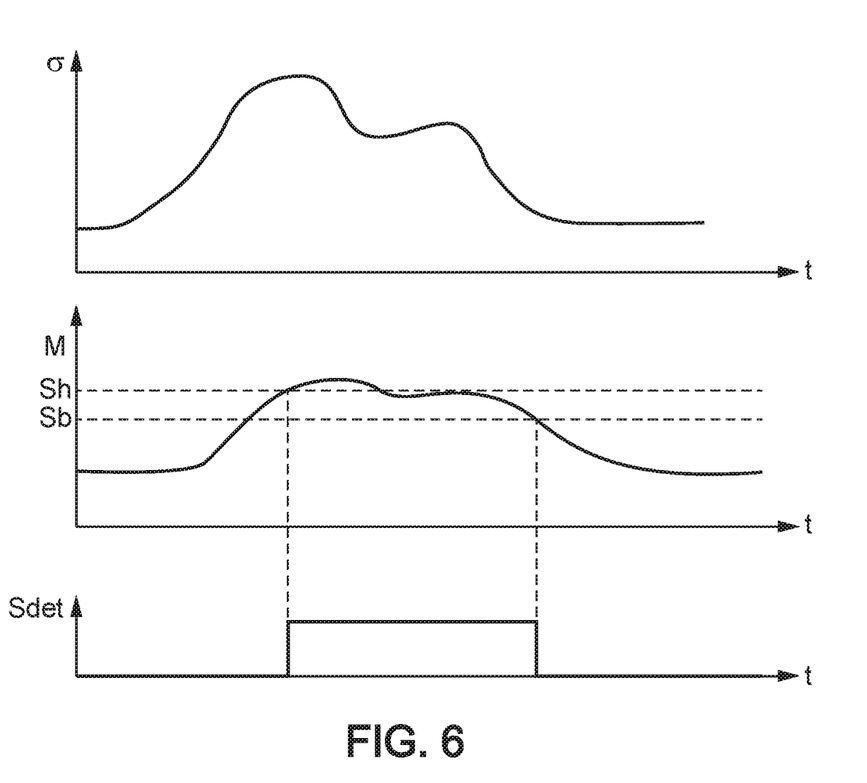
FIG. 6 shows graphs according to an alternative embodiment of the second part of the method according to the invention.

FIG. 6 shows graphs according to another variant embodiment of the second part of the method according to the invention. In such a configuration, the thresholding step 26 further comprises a step of calculating the average of the previously calculated noise, in particular using a plurality of calculated values for the noise B, and a step of comparing the calculated average with a low threshold Sb and a high threshold Sh.

Then, if the calculated average exceeds the high threshold Sh, the computer 14 transmits the signal indicating detection of the presence of ice crystals in the atmosphere, during communication step 28 or 38, in particular towards the cockpit.

Optionally, in addition, if the signal indicating detection of the presence of ice crystals in the environment, such as the atmosphere, is transmitted, the computer 14 does not stop communicating the signal indicating detection of ice crystals in the environment as long as the average calculated in each iteration does not fall below the low threshold Sb.

According to another variant, the noise B is calculated from a calculation of the Fourier transform of the comparison signal Comp(t) in time window $FT_i$.

Of course, the invention is not limited to the embodiments described above and provided only as examples. It encompasses various modifications, alternative forms, and other variants conceivable to those skilled in the art within the scope of the present invention, and in particular any combination of the different modes of operation described above which can be applied separately or in association.

The emitted radiation comprises rays within a first wavelength band $\lambda_1$ and rays within a second wavelength band $\lambda_2$.

The detection device 2 is in relative motion with respect to the environment. This relative motion may result from the motion of the aircraft relative to its environment, for example when the aircraft is in flight, or may result from the motion of the wind relative to an aircraft parked on the tarmac or the motion of air propelled by a propeller of an airplane or helicopter or the motion of air being suctioned by an air intake.

In summary, the invention relates to a method for detecting the presence of ice crystals in the atmosphere, for aircraft. The method is implemented by a detection device 2 comprising at least one transmitter 4 having an emission axis E-E, a receiver 10 having a reception axis R-R intersecting the emission axis E-E in at least one point, and a computer 14 connected to the transmitter 4 and to the receiver 10. The method comprising the following steps:
emission 16 of radiation into the atmosphere;
reception 18 of at least a portion of the emitted radiation, said at least a portion of the received radiation including rays within a first wavelength band $\lambda_1$ and rays within a second wavelength band $\lambda_2$, characterized in that the method further comprises the following steps:
calculating 20 a comparison signal Comp(t) representative of the variation in the contrast over time t, the contrast being defined from the formula below:

$$Comp(t) = \frac{R_{\lambda 2}(t) - R_{\lambda 1}(t)}{R_{\lambda 2}(t) + R_{\lambda 1}(t)}$$

where $R_{\lambda 1}(t)$ is the intensity over time t of the rays within the first wavelength band $\lambda_1$ and $R_{\lambda 2}(t)$ is the intensity over time of the rays within the second wavelength band $\lambda_2$,
considering 22 a current time window $FT_i$ in the contrast signal Comp(t),
determining 24 the noise B of the contrast signal in the time window considered,
comparing 26 said noise B to a defined threshold S, and when said noise is greater than said defined threshold S, transmitting a signal indicating detection of the presence of ice crystals in the atmosphere, and
repeating the determination and comparison steps while considering a next time window $FT_{i+1}$, said next time window $FT_{i+1}$ being shifted in time by a duration D with respect to the current time window $FT_i$.

As a variant, the determination step comprises a step of calculating a standard deviation of the contrast signal in the time window considered.

As a variant, the determination step comprises a step of calculating the Fourier transform of the contrast signal in the time window considered.

As a variant, the repetition step further comprises the following steps:
- when the noise B is greater than said defined threshold S, incrementing 34 a value Cj of a counter,
- comparing 36 the value Cj of the counter to an alert threshold Sa,
- when the value Cj of the counter is greater than the alert threshold Sa, transmitting 38 a signal indicating detection of the presence of ice crystals, and initializing 40 the value Cj of the counter to zero.
- when the value Cj of the counter is below the alert threshold Sa, repeating the determination step 24 while considering the next time window.

In a variant, the shift duration D is less than the duration of the time window.

In a variant, the first wavelength band $\lambda_1$ is comprised between 1.5 µm and 1.7 µm, particularly between 1.5 µm and 1.6 µm, more particularly equal to 1.55 µm, and the second wavelength band $\lambda_2$ is comprised between 1.3 µm and 1.45 µm, particularly between 1.4 µm and 1.45 µm, more particularly equal to 1.42 µm.

In a variant, the comparison signal is equal to $$\frac{1}{comp(t)}$$

or is equal to K×Comp(t) where K is a real number.

In a variant, the comparison signal (Comp(t)) is representative of the variation in the contrast or the variation in any other signal enabling a comparison of the intensities of the optical radiations $R_{\lambda 1}(t)$ and $R_{\lambda 2}(t)$.

The invention claimed is:

1. Method for detecting the presence of ice crystals in an environment, implemented by a detection device in relative motion with respect to said environment, said method comprising at least:
    - an emission step, in which at least one optical radiation is emitted by the detection device into the environment;
    - a reception step, in which at least a portion of the emitted optical radiation is received by the detection device, said at least a portion of the received radiation including rays within a first wavelength band ($\lambda_1$) and rays within a second wavelength band ($\lambda_2$);
characterized in that the detection method further comprises at least:
    - a calculation step, in which the detection device calculates a comparison signal (Comp(t)) representative of the contrast, said contrast being obtained from the following formula:

$$Comp(t) = \frac{R_{\lambda 2}(t) - R_{\lambda 1}(t)}{R_{\lambda 2}(t) + R_{\lambda 1}(t)}$$

where $R_{\lambda 1}(t)$ is the intensity over time t of the rays within the first wavelength band ($\lambda_1$) and $R_{\lambda 2}(t)$ is the intensity over time of the rays within the second wavelength band ($\lambda_2$), and
    - a noise calculation step, in which a noise (B) of the comparison signal (Comp(t)) is calculated,
    - a thresholding step, in which the noise (B) is compared to a defined threshold (S),
    - a communication step, in which a signal indicating detection of the presence of ice crystals in the environment is transmitted when the noise (B) is greater than the defined threshold (S).

2. Detection method according to claim 1, wherein the detection method further comprises at least:
    a sampling step, in which a time window ($FT_i$) is defined.

3. Detection method according to claim 1, wherein the detection method further comprises at least:
    a continuation step, in which a next time window ($FT_{i+1}$) shifted in time by a duration (D) with respect to time window ($FT_i$) is considered, and/or
    a loop step, in which the noise calculation step and the thresholding step are repeated.

4. Detection method according to claim 3, wherein the shift duration (D) is less than the duration of the time window.

5. Detection method according to claim 3, wherein the detection method further comprises at least:
    an incrementing step, in which a value (Cj) of a counter is incremented when the noise (B) is greater than the defined threshold (S), and/or
    a confirmation step, in which the value (Cj) of the counter is compared to a triggering threshold (Sa).

6. Detection method according to claim 5, wherein the communication step, is transmitted when the value (Cj) of the counter is greater than the triggering threshold (Sa).

7. Detection method according to claim 6, wherein the detection method further comprises at least:
    a reset step, in which the counter value (Cj) is initialized to zero.

8. Detection method according to claim 1, wherein the noise calculation step comprises a step of calculating a standard deviation of the comparison signal (Comp(t)) in the time window considered.

9. Detection method according to claim 1, wherein the noise calculation step comprises a step of calculating the Fourier transform of the comparison signal in the time window considered.

* * * * *